(12) United States Patent
Tanabe

(10) Patent No.: US 8,423,689 B2
(45) Date of Patent: Apr. 16, 2013

(54) COMMUNICATION CONTROL DEVICE, INFORMATION PROCESSING DEVICE AND COMPUTER PROGRAM PRODUCT

(75) Inventor: Noboru Tanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 12/320,954

(22) Filed: Feb. 10, 2009

(65) Prior Publication Data

US 2009/0210586 A1 Aug. 20, 2009

(30) Foreign Application Priority Data

Feb. 15, 2008 (JP) .................. 2008-034464

(51) Int. Cl.
*G06F 3/00* (2006.01)
*G06F 7/00* (2006.01)

(52) U.S. Cl.
USPC ............. 710/52; 710/49; 710/55; 707/698; 370/395.32

(58) Field of Classification Search ............ 710/52
See application file for complete search history.

(56) References Cited

U.S. PATENT DOCUMENTS

| | | | | |
|---|---|---|---|---|
| 6,125,399 | A * | 9/2000 | Hamilton | 709/245 |
| 6,631,422 | B1 * | 10/2003 | Althaus et al. | 709/250 |
| 6,757,742 | B1 * | 6/2004 | Viswanath | 709/246 |
| 6,985,974 | B1 * | 1/2006 | Medina | 710/52 |
| 7,212,526 | B2 | 5/2007 | Kanetake | |
| 2003/0081615 | A1 * | 5/2003 | Kohn et al. | 370/395.42 |
| 2003/0137978 | A1 | 7/2003 | Kanetake | |

FOREIGN PATENT DOCUMENTS

| | | |
|---|---|---|
| JP | 63-003351 | 1/1988 |
| JP | 02-310649 | 12/1990 |
| JP | 10-293754 | 11/1998 |
| JP | 2003-218918 | 7/2003 |
| JP | 2006-206229 | 8/2006 |

OTHER PUBLICATIONS

Office Action in Japanese Patent Application No. 2008-034464, dated Dec. 22, 2009, and Partial English-language translation.
Underwood et al., "A Hardware Acceleration Unit for MPI Queue Processing", Proceedings of $19^{th}$ International Parallel and Distributed Processing Symposium (IPDPS 05), 10 pages.
Tanabe et al., "Hardware Support MPI in DIMMnet-2 Network Interface", Proceedings of International Workshop on Innovative Architecture for Future Generation High-Performance Processors and Systems (IWIA'06), pp. 1-8.

(Continued)

*Primary Examiner* — Henry Tsai
*Assistant Examiner* — Dean Phan
(74) *Attorney, Agent, or Firm* — Nixon & Vanderhye, P.C.

(57) ABSTRACT

A communication control device includes a plurality of receive buffers each storing therein received information that corresponds to all or a part of a received message or an argument of a receive function, a hash-value generating unit that generates a hash value from a receive key contained in the received message in accordance with a hash-value generation rule, a storing unit that stores the received information in a selected one of the receive buffers corresponding to the hash value, and an output unit that outputs the received information from one of the receive buffers corresponding to the hash value in response to a transmission request from a receiving unit that performs a receiving operation by determining a matching based on a receive key specified by the receive function.

6 Claims, 9 Drawing Sheets

OTHER PUBLICATIONS

Liu et al., "Performance Comparison of MPI Implementations Over InfiniBand, Myrinet and Quadrics", IEEE Proceedings of SC "03" Nov. 2003., pp. 1-14.

Otsuka et al., "Performance Evaluation of RHiNET-2: A Network for Distributed Parallel Processing", SACSIS2003, ISSN1344-0640, May 2003, pp. 45-52.

Kitamura et al., "Implementation of Packet Receiving Mechanism Supporting for Message Passing Model", ISSN0919-6072, Nov. 2005, pp. 39-44.

Tanabe et al., "Support Functions for MPI on DIMMnet-3 Network Interface", ISSN0919-6072, Jul. 2006, pp. 103-106.

* cited by examiner

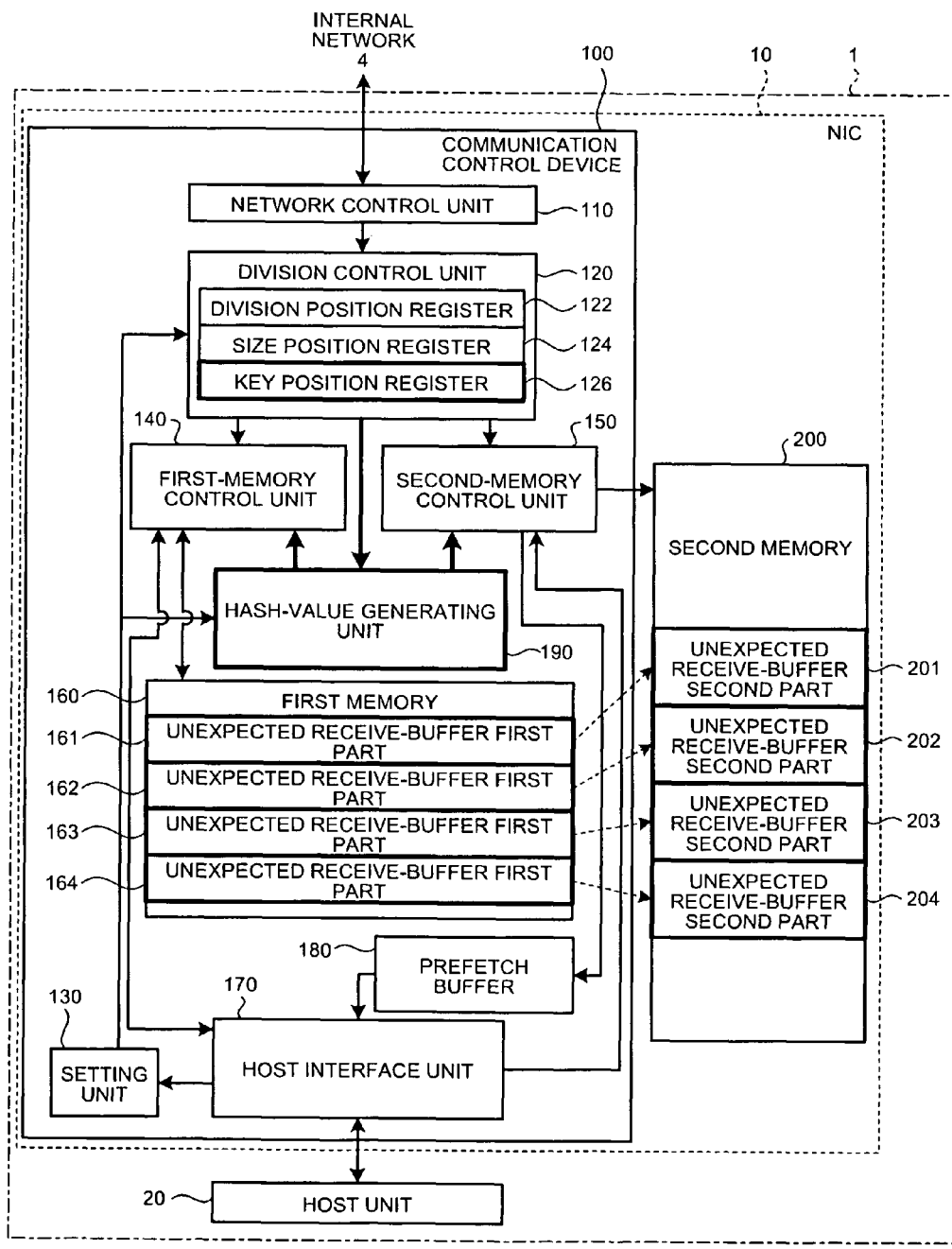

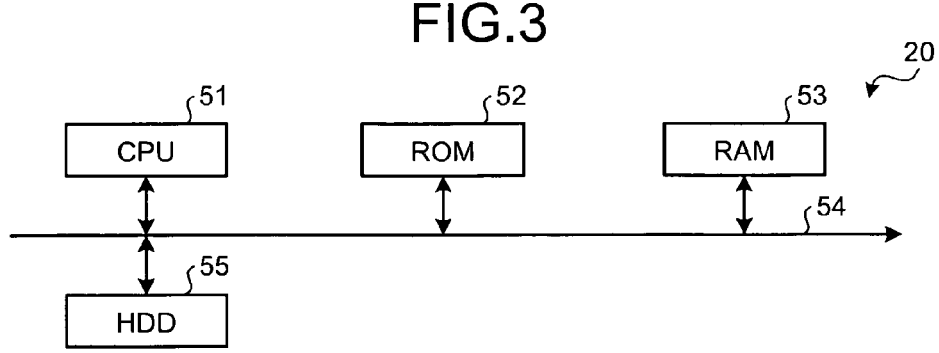
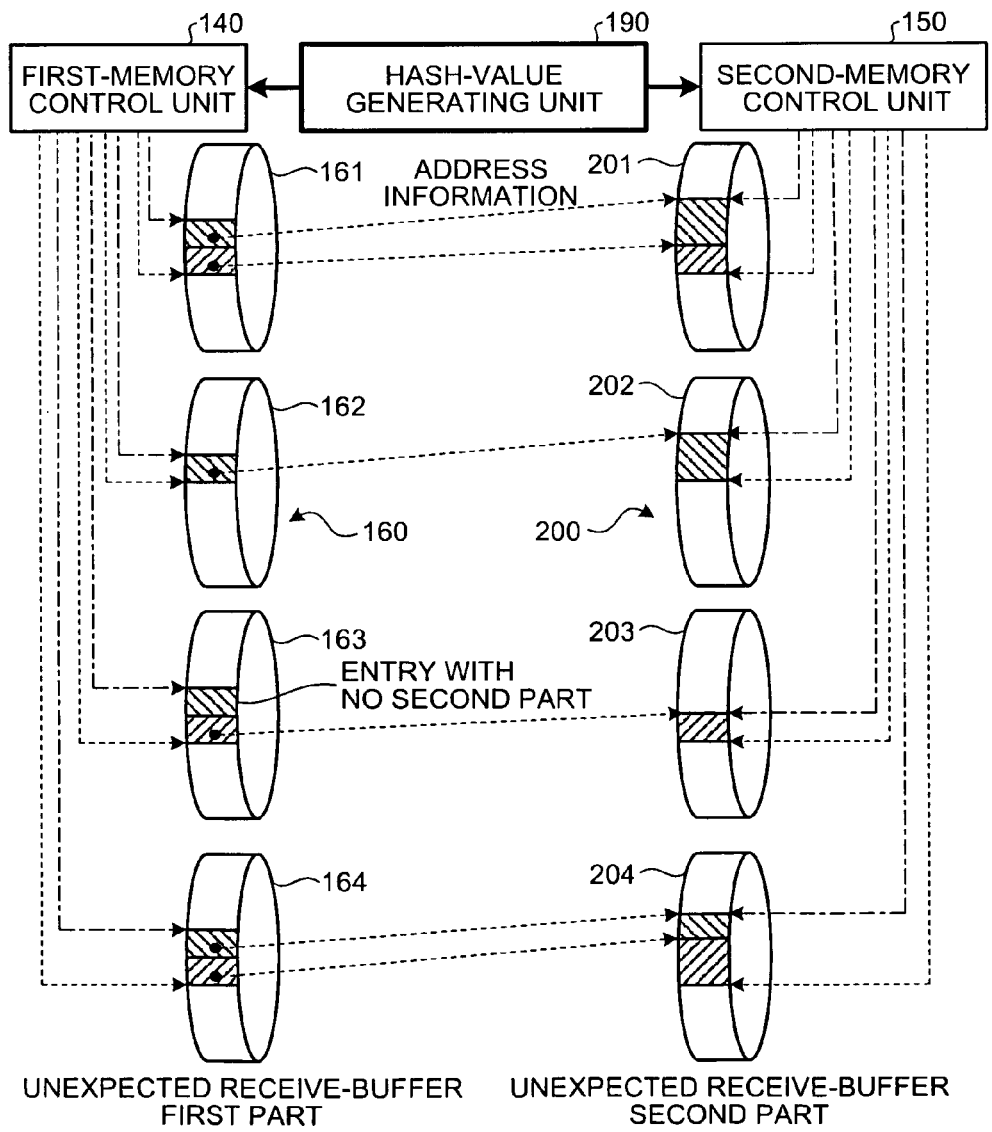

SUM OF TIMES REQUIRED FOR TRANSFERRING ENVELOPES AND FOR COMPARING KEYS OF "ALL" MESSAGES RECEIVED EARLIER

- ▥ PROCESSING TIME OF ENVELOPE CORRESPONDING TO HASH VALUE 0
- ▯ PROCESSING TIME OF ENVELOPE CORRESPONDING TO HASH VALUE 1
- ▮ PROCESSING TIME OF ENVELOPE CORRESPONDING TO HASH VALUE 2
- ▨ PROCESSING TIME OF ENVELOPE CORRESPONDING TO HASH VALUE 3

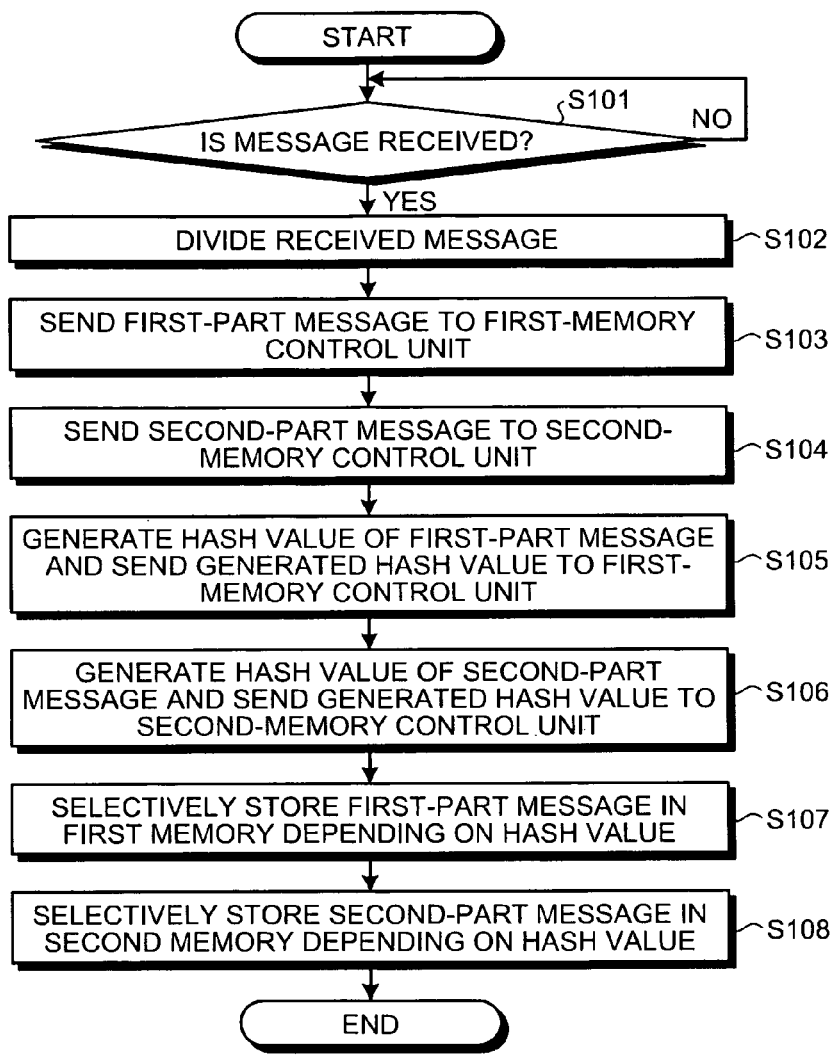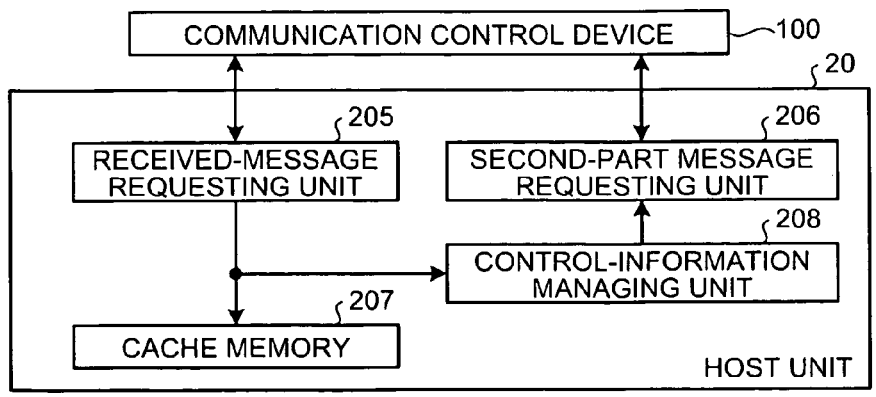

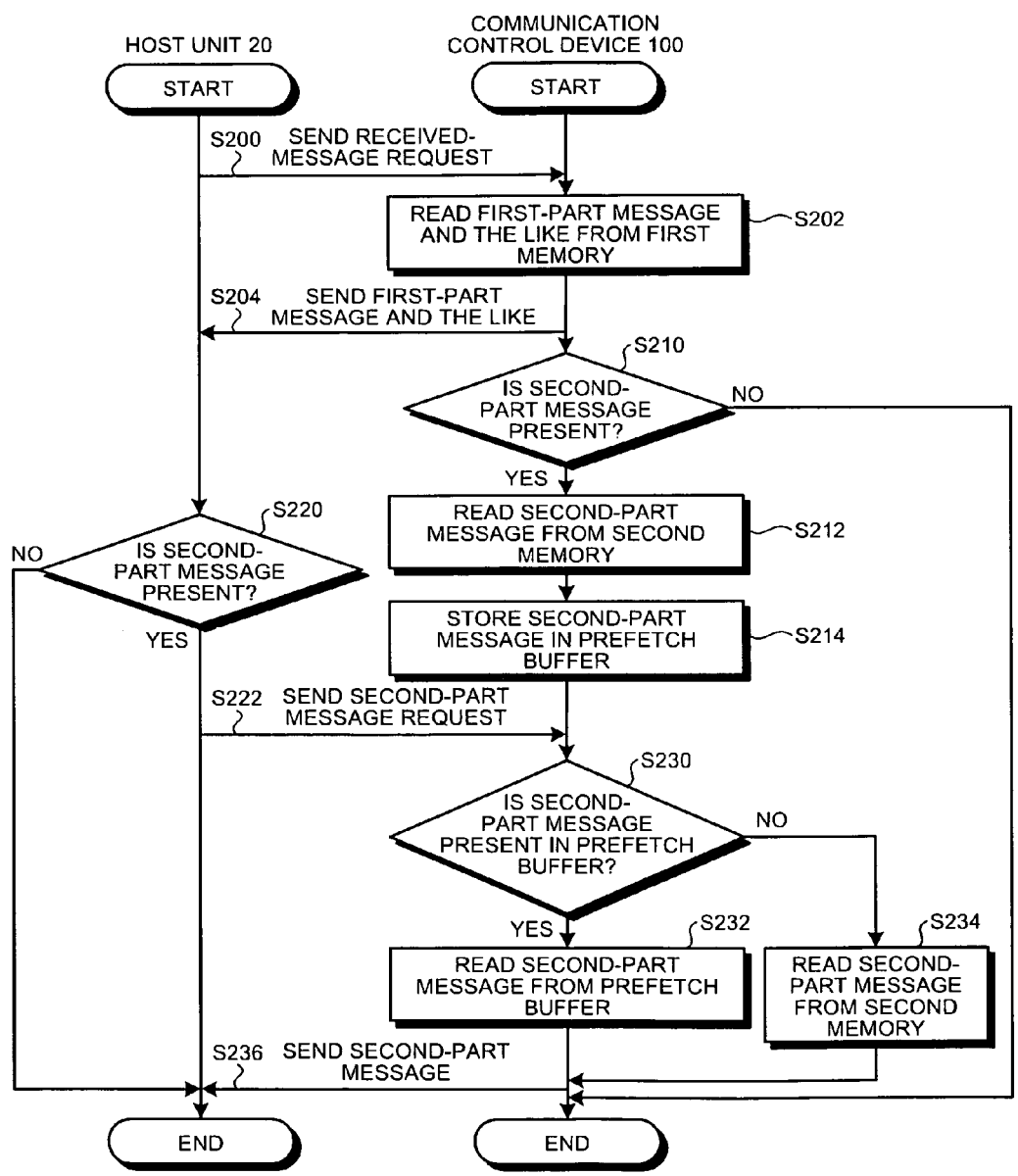

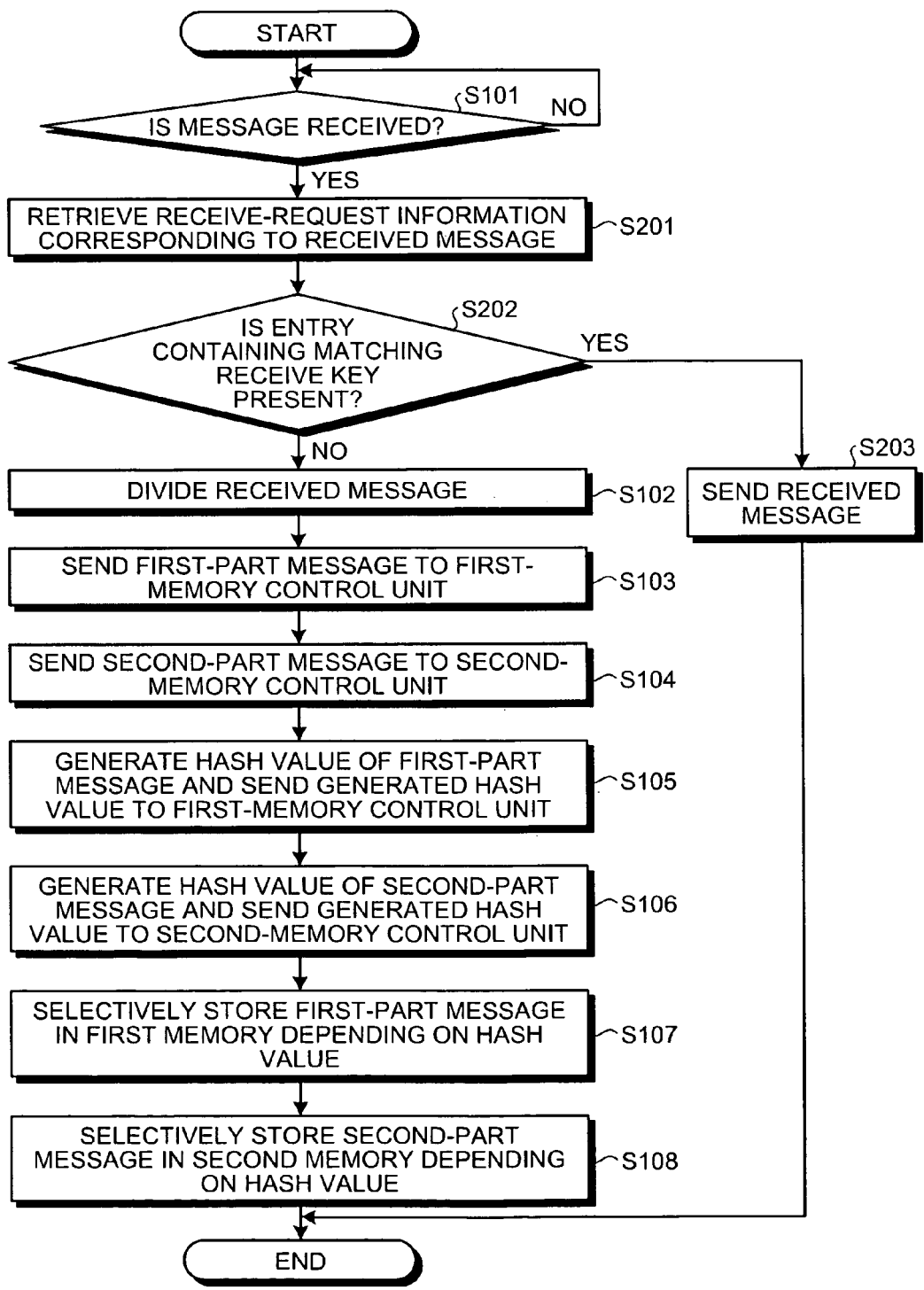

COMMUNICATION CONTROL DEVICE, INFORMATION PROCESSING DEVICE AND COMPUTER PROGRAM PRODUCT

CROSS-REFERENCE TO RELATED APPLICATIONS

This application is based upon and claims the benefit of priority from the prior Japanese Patent Application No. 2008-034464, filed on Feb. 15, 2008; the entire contents of which are incorporated herein by reference.

BACKGROUND OF THE INVENTION

1. Field of the Invention

The present invention relates to a communication control device, an information processing device, and a computer program product.

2. Description of the Related Art

In a conventional technology, a personal computer (PC) cluster and a parallel computer perform communication by using a message switching system. In a parallel application in particular, widely used communication systems employ message passing libraries as represented by Message Passing Interface (MPI) which is a library for message passing in a distributed-memory type parallel processing.

Various types of network interfaces for PC clusters have been used in combination with the MPI in various manners; such as, Infiniband HCA by Mellanox Technologies, Inc., Myrinet by Myricom, Inc., and QsNET II by Quadrics, Inc. (for example, see "Performance comparisons of MPI implementations over InfiniBand, Myrinet and Quadrics", IEEE Proceedings of SC '03, November, 2003).

One prototype-level example reported in Japan implements the MPI on RHiNET-2 (for example, see "Performance evaluation of RHiNET-2 network for distributed parallel processing", Symposium on Advanced Computing Systems and Infrastructures (SACSIS) 2003, ISSN 1344-0640, May, 2003). Furthermore, it has been reported that the MPI is implemented on the DIMMnet-2 that is plugged into a memory slot (for example, see "Implementation of MPI-2 communication library on DIMMnet-2", study report by Information processing society of Japan special interest group on computer architecture, ISSN 0919-6072, February, 2006).

The reported systems are configured so that data received from a network is stored temporarily in a memory on a network interface board or in a buffer formed in a reserved area, which is not intended for swapping out, of a main memory in a host computer.

In a parallel system, there is no guarantee that a receiver always activates a corresponding receive function before receiving a message, or that the receiver always receives messages from a plurality of transmitters via a network in a desired order. Therefore, in message passing libraries such as the MPI, when the receive function is executed, first, a desired message is retrieved from a buffer called "unexpected message queue". A message that does not correspond to a receive key is removed from the current buffer to a different buffer until the desired message is found.

The DIMMnet-2 performs a first-in first-out (FIFO) operation by using an IPUSH mechanism that is a pointer controlled by hardware. Furthermore, the DIMMnet-2 writes data in receive buffers that are selectively used depending on a source group. With such an operation, the DIMMnet-2 avoids interposition of firmware in the receiver. Moreover, it has been reported that, in the DIMMnet-2, a communication latency of the MPI is reduced by improving a success probability for retrieval from the buffers (for example, see "Implementation of packet receiving mechanism supporting for message passing model", study report by Information processing society of Japan special interest group on computer architecture, ISSN 0919-6072, November, 2005).

On the other hand, some conventional examples support the speeding up of the message retrieval from the unexpected message queue in the MPI by hardware. Specifically, a large number of logic blocks each called "ALPU" that is a random logic and includes a comparator and a register are connected like a shift register. With this arrangement, an entry that matches a key can be extracted from the middle of the unexpected message queue whereby the speeding up of the message retrieval is achieved (for example, see "A hardware acceleration unit for MPI queue processing" by K. D. Underwood, K. S. Hemmert, A. Rodrigues, R. Murphy, and R. Brightwell, 19th International parallel and distributed processing symposium, IPDPS '05, April, 2005).

Furthermore, it has been reported that, in an LHS mechanism, a first part (first half) and a second part (second half) of a message are separately stored in memories having different properties. Information required for matching in the MPI is likely to be contained in the first part of the message. By storing the first part separately in a specific memory, such information can be taken into a host device with a low latency, whereby the communication latency of the MPI is reduced (for example, see "Support function for MPI on DIMMnet-3 network interface", study report by Information processing society of Japan special interest group on computer architecture, ISSN 0919-6072, July, 2006).

However, the buffer-retrieval operations as described above is accompanied by a large amount of copy operations performed between memories by software unless the operation is supported by hardware as described in "A hardware acceleration unit for MPI queue processing" by K. D. Underwood, K. S. Hemmert, A. Rodrigues, R. Murphy, and R. Brightwell. Therefore, unless the receiver receives the message in a desired order, the latency in message reception increases.

If the memory arranged on the network interface board has a small capacity like Myrinet, for example, the memory on the board does not have a capacity to form all of receive buffers of the MPI. Therefore, it is necessary to immediately send a message received from a network to a main memory of a host device via an I/O bus such as a PCI bus. If the message remains on the network interface board, the network gets blocked with messages, resulting in congestion of the network. Because the messages are continuously sent to the receive buffers of the MPI arranged in the main memory of the host device via the PCI bus, or the like, by repeating a direct memory access (DMA) transmission several times, the communication latency is increased.

If, like the DIMMnet-2, the memory arranged on the network interface board is a dynamic random access memory (DRAM) based memory and the memory has a capacity as large as that of the main memory of the host device, data to be remotely accessed from the network can be arranged in the memory on the network interface board. Furthermore, all of the receive buffers of the MPI can be arranged in the memory on the network interface board. Therefore, a received message can be stored in the buffer of the MPI arranged in the memory on the network interface board when the receiver does not activate a corresponding receive function before receiving the message.

However, because it takes longer for the host device to access the memory on the network interface board than the main memory of the host device, a retrieval time of a message corresponding to a receive key can be longer. Therefore, it is difficult to reduce a receive latency of the MPI.

Furthermore, when a circuit block called "ALPU" is formed by the random logic in such a manner that the retrieval in the buffers is supported by the hardware as described in "A hardware acceleration unit for MPI queue processing" by K. D. Underwood, K. S. Hemmert, A. Rodrigues, R. Murphy, and R. Brightwell, a size of the logic circuit is increased. It causes adverse effects such as restriction on other circuits in large scale integration (LSI) or a capacity of the buffer, a limitation on a frequency, or an increase in power consumption. Moreover, in a large-scale parallel system, because it is difficult to implement a sufficient number of ALPUs in the LSI, such an insufficiency needs to be supported by software, which results in a performance degradation.

Moreover, in the LHS mechanism described in "Support function for MPI on DIMMnet-3 network interface", study report by Information processing society of Japan special interest group on computer architecture, the first parts of the messages are stored in the memory with a low latency in the order of message reception. Therefore, if a large number of messages each having a receive key that does not match a receive key specified by the receive function of the MPI is received before a message having a matching receive key is received, it is necessary to perform comparison on the messages a large number of times in the order of reception, starting from the leading message, which results in a significant performance degradation.

SUMMARY OF THE INVENTION

According to one aspect of the present invention, a communication control device includes a plurality of receive buffers each storing therein received information that corresponds to all or a part of a received message or an argument of a receive function, a hash-value generating unit that generates a hash value from a receive key contained in the received message in accordance with a hash-value generation rule, a storing unit that stores the received information in a selected one of the receive buffers corresponding to the hash value, and an output unit that outputs the received information from one of the receive buffers corresponding to the hash value in response to a transmission request from a receiving unit that performs a receiving operation by determining a matching based on a receive key specified by the receive function.

According to another aspect of the present invention, a communication control device includes a plurality of receive buffers each storing therein all or a part of a received message to be processed by a library for message passing in a distributed-memory parallel processing, a hash-value generating unit that generates a hash value from a receive key contained in the received message in accordance with a hash-value generation rule, a message storing unit that stores the received message in a selected one of the receive buffers corresponding to the hash value generated from the receive key contained in the received message, and a message output unit that outputs at least one candidate for the received message corresponding to a receive function from one of the receive buffers corresponding to a hash value generated from a receive key specified by the receive function in response to a transmission request from a receiving unit that performs a receiving operation by determining a matching based on the receive key specified by the receive function.

According to still another aspect of the present invention, a communication control device includes a plurality of receive buffers each storing therein receive-request information corresponding to all or a part of an argument of a receive function to be used by a library for message passing in a distributed-memory parallel processing, a hash-value generating unit that generates a hash value from a receive key contained in a received message in accordance with a hash-value generation rules a receive-request storing unit that stores the receive-request information corresponding to the receive function received from a receiving unit that performs a receiving operation by determining a matching based on a receive key in a selected one of the receive buffers corresponding to a hash value generated from a receive key of the receive function until a received message corresponding to the receive function is received, and a message output unit that, upon reception of the received message, if the receive-request information is stored in one of the receive buffers corresponding to the hash value generated from the receive key contained in the received message, outputs the received message.

According to still another aspect of the present invention, an information processing device includes a communication control device as described above, and a host unit that contains the hash-value generation rule to be used by the hash-value generating unit included in the communication control device, and acquires, from the communication control device, received information stored in a desired one of receive buffers included in the communication control device based on a hash value obtained by an input of a receive key specified by a receive function.

According to still another aspect of the present invention, a computer program product has a computer readable medium including programmed instructions for communication control. The instructions, when executed by a computer, cause the computer to perform generating a hash value from a receive key contained in a received message in accordance with a hash-value generation rule, storing received information in a selected one of receive buffers corresponding to the hash value, the receive buffers each adopted to store received information that corresponds to all or a part of a received message or an argument of a receive function, and outputting the received information from one of the receive buffers corresponding to the hash value in response to a transmission request from a receiving unit that performs a receiving operation by determining a matching based on a receive key specified by the receive function.

BRIEF DESCRIPTION OF THE DRAWINGS

FIG. 2 is a block diagram of a PC according to the first embodiment;

FIG. 3 is a block diagram of a host unit included in the PC according to the first embodiment;

FIG. 4 is a schematic diagram for explaining data structures of a first memory and a second memory included in the PC according to the first embodiment;

FIG. 7 is a flowchart of a message receiving operation performed by a communication control device included in the PC according to the first embodiment;

FIG. 8 is a block diagram for explaining the functional configuration of the host unit according to the first embodiment;

FIG. 9 is a flowchart of an operation of transferring a received message from the communication control device to the host unit according to the first embodiment;

FIG. 11 is a flowchart of a message receiving operation performed by a communication control device included in the PC according to the second embodiment.

DETAILED DESCRIPTION OF THE INVENTION

Exemplary embodiments of a communication control device, an information processing device, and a computer program product according to the present invention are explained in detail below with reference to the accompanying drawings.

A first embodiment of the present invention is described with reference to FIGS. 1 to 9. A communication control device according to the first embodiment is realized as an LSI arranged on a network interface card (NIC), and an information processing device according to the first embodiment is realized as a personal computer (PC).

Figure 1:
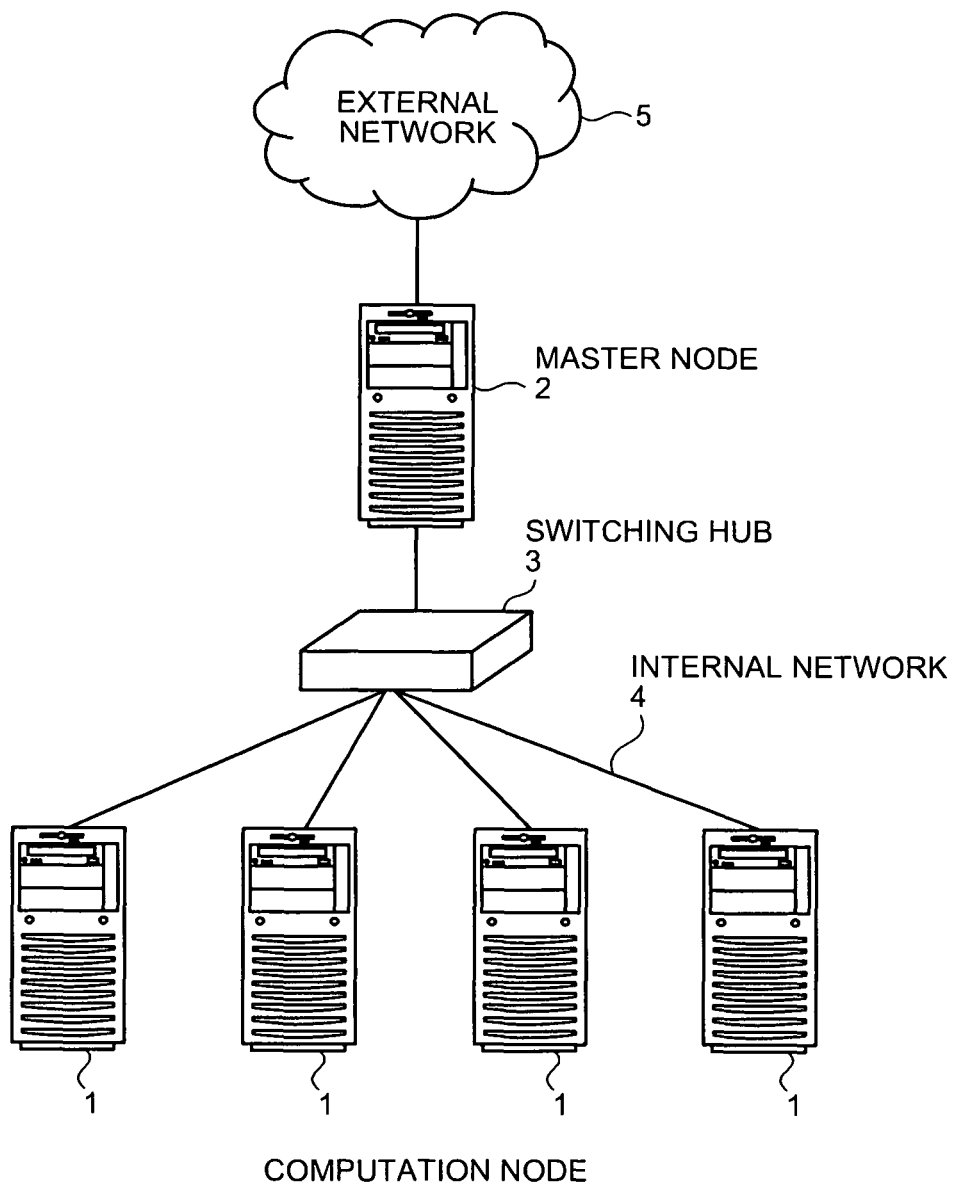
FIG. 1 is a schematic diagram of a configuration of a PC cluster according to a first embodiment of the present invention.

FIG. 1 is a schematic diagram for explaining a configuration of a PC cluster according to the first embodiment. As shown in FIG. 1, the PC cluster is a type of parallel computer formed by connecting a plurality of PCs via a network. The PC cluster includes a plurality of PCs 1 that are computation nodes which perform computation, and a PC 2 that is a master node which has control over the entire system. The PC cluster of the first embodiment is a disk cluster in which each of the PCs 1, i.e., the computation nodes, has a disk. The PC 2 (i.e., master node) is connected to the PCs 1 (i.e., computation nodes) with an internal network 4 via a switching hub 3, and only the PC 2 (i.e., master node) is connected to an external network 5. The internal network 4 is used as a network for a command or a network file system (NFS) and as a network for a message passing interface (MPI). The MPI is a parallel library that realizes a parallel processing by transmitting messages between central processing units (CPUs).

The PC 1 which is a computation node characterizing the first embodiment is described with reference to FIG. 2, which is a block diagram for explaining the configuration of the PC 1. As shown in FIG. 2, the PC 1 includes a NIC 10 and a host unit 20 that functions as a receiving unit that performs a receiving operation by determining a matching based on a receive key specified by a receive function as described later in detail.

FIG. 3 is a block diagram of the host unit 20. As shown in FIG. 3, the host unit 20 performs various operations of the PC 1, and, in the same manner as a generally used PC, includes a CPU 51 that is a main unit of the PC 1 and that controls each unit of the PC 1 in a centralized manner. The CPU 51 is connected, via a bus 54, to a read-only memory (ROM) 52 in which a basic input/output system (BIOS), or the like, is stored and a random access memory (RAM) 53 that functions as a work area for the CPU 51. Furthermore, a hard disk drive (HDD) 55 in which various computer programs are stored is connected to the bus 54 via an I/O (not shown). The CPU 51 performs various operations based on a computer program loaded on the HDD 55 that is used as a main memory in this system.

A computer program stored in the HDD 55 can be stored and provided, in a form of a file that is installable and executable on a computer, in a recording medium readable by the computer, such as a compact disk-read only memory (CD-ROM), a flexible disk (FD), and a digital versatile disk (DVD). In such a case, the computer program is read from the recording medium and the read computer program is executed, so that the computer program is loaded on the HDD 55, which is a main memory, thereby creating each functional component for performing various operations on the HDD 55. Alternatively, the computer program can be stored in another computer connected to the computer via a network such as the Internet, and downloaded to the computer via the network.

The NIC 10 is one type of hardware used for performing communication between the PCs 1. The NIC 10 of the first embodiment includes a communication control device 100 that is an LSI and a second memory 200 as shown in FIG. 2.

The second memory 200 is a DRAM-based memory. The second memory 200 is arranged on the NIC 10 outside of the communication control device 100 as shown in FIG. 2. Compared with a first memory 160 included in the communication control device 100, the second memory 200 has a larger capacity with a higher latency, i.e., the second memory 200 requires a longer delay time from an issue of a request such as a data transmission request to a reception of a result in response to the request.

Alternatively, the second memory 200 can be arranged inside of the communication control device 100, or still alternatively, outside of the NIC 10. Alternatively, the second memory 200 can be formed in the main memory of the host unit 20. Furthermore, the second memory 200 may have a configuration other than a DRAM-based configuration.

As shown in FIG. 2, the communication control device 100 includes a network control unit 110, a division control unit 120, a setting unit 130, a first-memory control unit 140, a second-memory control unit 150, the first memory 160, a host interface unit 170, a prefetch buffer 180, and a hash-value generating unit 190.

The network control unit 110 performs operations, such as flow control and retransmission control, in layers lower than a transport layer in an open systems interconnection (OSI) reference model. The network control unit 110 receives a message from the internal network 4, and obtains it as a received message (received information). The network control unit 110 detects an error in the received message and corrects the detected error, and sends the corrected received message to the division control unit 120.

The division control unit 120 includes a division position register 122, a size position register 124, and a key position register 126. The division control unit 120 divides the received message.

The division position register 122 stores therein division position information on the received message. The division position information indicates a division position at which the received message is divided. Specifically, the division position information indicates a position with reference to a starting position by a number of bytes.

The size position register 124 stores therein size position information on the received message. The size position information indicates a position in the received message at which size information indicative of a data size of the received message is stored.

The key position register 126 stores therein key position information on the received message. The key position information is information of a position in the received message at which a receive key is stored. Specifically, the key position information indicates a position with reference to a starting position by a certain number of bytes, for example. The receive key is specified by a receive function, and is used for determining whether the message is to be received by performing matching and comparison based on the receive key.

For example, the receive key corresponds to "tag" (message tag), "comm" (communicator), or "source" (source rank) that are arguments for the receive function MPI_Irecv( ) in the MPI, and is contained in an area called "envelope" that is stored in a first-part message of the received message.

With the above configuration, the division control unit 120 divides the received message into a first-part message and a second-part message as appropriate by using the division position information stored in the division position register 122 and the size position information stored in the size position register 124. Thus, the division control unit 120 of the first embodiment functions as a dividing unit.

The division control unit 120 then sends the first-part message to the first-memory control unit 140, and sends the second-part message to the second-memory control unit 150. The division control unit 120 also sends the received message having a relatively small size, i.e., a small-sized received message that does not need to be divided, to the first-memory control unit 140.

The first-part message contains data to be used by the host unit 20 at the beginning of a receiving operation. The receiving operation is performed when the received message is obtained via the internal network 4. For example, in the MPI, it is determined whether the receive key specified by the receive function matches a receive key contained in the envelope at the beginning of the receiving operation. Thus, the envelope is information to be used at the beginning of the receiving operation. Each of the first-part message and the small-size received message contains the envelope as data to be used at the beginning. The second-part message is a part of the received message other than the first-part message.

The division control unit 120 sends the receive key contained in the envelope of the received message (the first-part message or the small-size received message) to the hash-value generating unit 190.

The hash-value generating unit 190 generates a hash value from the receive key input by the division control unit 120 based on a predetermined hash function (a hash-value generation rule), and outputs the generated hash value to the first-memory control unit 140 and the second-memory control unit 150.

The setting unit 130 sets the division position information in the division position register 122 in accordance with an instruction from a user, or the like. Thus, the division position can be adjusted. Moreover, the setting unit 130 sets the size position information in the size position register 124. Thus, a format of a receivable message can be flexibly changed. In other words, it is possible to process messages in various formats.

The division position register 122, the size position register 124, the key position register 126, and the setting unit 130 are not necessarily essential components. Appropriate fixed values can be set as the division position information, the size position information, and the key position information in advance.

Compared with the second memory 200, the first memory 160 has a smaller capacity with a lower latency, i.e., the first memory 160 requires a shorter delay time from an issue of a request such as a data transmission request to a reception of a result in response to the request. The first memory 160 is typically a high-speed static RAM (SRAM) that is incorporated in the LSI.

For example, it is difficult to arrange an entire system buffer of the MPI in the communication control device 100 when capacity is considered. However, the first memory 160 is not necessarily incorporated in the LSI. Therefore, in the first embodiment, two types of memories, the first memory 160 and the second memory 200, with the different capacities and latencies are separately used for speeding up of the message passing.

The first memory 160 includes a plurality of buffers in which a plurality of entries can be stored. If the receive function for receiving the received message (the first-part message, or the like) is not called by the host unit 20 although the message is received, it is necessary to buffer the received message until the receive function is called. A queue for buffering the received message until the receive function is called is called "unexpected message queue". Specifically, the buffers arranged in the first memory 160, when used for the MPI, temporarily store therein the received message (the first-part message, or the like) that is received before the receive function having the corresponding receive key is called. In the first embodiment, the receive buffers that temporarily store therein the received message (the first-part message, or the like) by the unexpected message queue are referred to as unexpected receive-buffer first parts 161 to 164.

The first-memory control unit 140 controls the first memory 160. Specifically, the first-memory control unit 140 stores the first-part message or the whole of the small-size received message received from the division control unit 120 in the first memory 160. Moreover, the first-memory control unit 140 reads data from the first memory 160 and sends the read data to the host interface unit 170.

As described above, the first-part message or the small-size received message is stored in the first memory 160 that has the small capacity with the low latency, so that it is possible to send the first-part message or the small-size received message to the host unit 20 with a lower latency compared with a case where the first-part message or the small-size received message is stored in the second memory 200 that has the large capacity with the high latency.

The second memory 200 stores therein data that cannot be stored in the first memory 160, i.e., the second-part message of the received message. In the same manner as the first memory 160, the second memory 200 includes a plurality of buffers in which a plurality of entries can be stored. When used for the MPI, the buffers temporarily store therein the received message (the second-part message) that is received before the receive function having the matching receive key is called. In the first embodiment, the buffers that temporarily store therein the received message (the second-part message) by the unexpected message queue are referred to as unexpected receive-buffer second parts 201 to 204.

The second-memory control unit 150 controls the second memory 200 that has the large capacity with the high latency. Specifically, the second-memory control unit 150 stores the second-part message received from the division control unit 120 in the second memory 200. Moreover, the second-memory control unit 150 reads data from the second memory 200, and sends the read data to the host interface unit 170 or the prefetch buffer 180.

Data structures of the first memory 160 and the second memory 200 are described with reference to FIG. 4.

As shown in FIG. 4, the unexpected receive-buffer first parts 161 to 164 store therein the first-part message or the whole of the small-size received message in an entry. The first-part message is stored with a subsequent pointer (address information indicated by a dotted line in FIG. 4) in the same entry. The subsequent pointer indicates an address of the second-part message subsequent to the first-part message.

The unexpected receive-buffer first parts 161 to 164 are controlled by the first-memory control unit 140 like a ring. Specifically, the unexpected receive-buffer first parts 161 to 164 are ring buffers that function as FIFO buffers. The first-memory control unit 140 stores therein a head pointer (address information indicated by a dashed-dotted line in FIG. 4) and an end pointer (address information indicated by a dotted line in FIG. 4) of a used area (a memory area indicated by hatching in FIG. 4). The head pointer and the end pointer can be stored in a register that is a random logic, or in a memory to support the large scale.

The first-part message or the whole of the small-size received message is stored as an entry in the ring buffer (any one of the unexpected receive-buffer first parts 161 to 164) that is selected based on the hash value generated by the hash-value generating unit 190. Thus, functions of a message storing unit and a storing unit are performed.

An operation of writing the first-part message or the whole of the small-size received message in the ring buffer (any one of the unexpected receive-buffer first parts 161 to 164) can be performed, for example, by hardware using the IPUSH mechanism. The IPUSH mechanism is described in "Implementation of packet receiving mechanism supporting for message passing model", study report by Information processing society of Japan special interest group on computer architecture as described above.

A data size for each entry is set to, for example, 32 bytes in advance. The data size is determined corresponding to a line size of the CPU 51 of the host unit 20. It is desirable to store data as much as possible in the first memory 160 in terms of quicker data transmission to the host unit 20. However, if the data size for each entry is made larger, a free space is reduced. Therefore, it is preferable that the data size for the entry is determined to be an optimum point of performance in accordance with the above trade-off.

Furthermore, it is preferable that the data size for the entry is determined such that control information such as the envelope can be always contained in the entry. Moreover, it is preferable that the data size for the entry is determined such that the whole of a relatively small-size received message, such as a message used for control, can be stored in the entry. Thus, data portion of the small-size received message is sent to the host unit 20 at the same time the entry in which the envelope is contained is sent to the host unit 20.

It is often the case that the small-size received message is data that needs to be processed with a low latency. When the small-size received message is received via the internal network 4 after a large-size message is received, the host unit 20 often requests the small-size received message prior to the large-size message. As described above, because the small-size received message is stored in the first memory 160, it is possible to send the small-size received message to the host unit 20 with a low latency.

Moreover, a data size of the subsequent pointer is set to, for example, 4 bytes in advance. In such a case, the data size of the first-part message stored in each entry is defined by subtracting 4 bytes that is the data size of the subsequent pointer from 32 bytes that is the data size for the entry, and therefore, the data size of the first-part message stored in each entry is 28 bytes. Therefore, the division position information indicating a position which is 28 bytes from the starting position is set as the division position in the division position register 122.

The small-size received message does not have the second-part message and the whole of the small-size received message is stored in the entry like the entry in the head of the unexpected receive-buffer first part 163 as shown in FIG. 4. In such a case, it is not necessary to store the subsequent pointer. Therefore, it is possible to store data having a data size larger than the data size of the first-part message, i.e., 28 bytes, as far as the data has a data size less than the data size for the entry, i.e., 32 bytes.

As shown in FIG. 4, the unexpected receive-buffer second parts 201 to 204 of the second memory 200 are also controlled by the second-memory control unit 150 like a ring. Specifically, a plurality of ring buffers each having the FIFO configuration and in which an entry size is variable is formed in the second memory 200, and the second-part message is stored as an entry in the ring buffer (any one of the unexpected receive-buffer second parts 201 to 204) that is selected based on the hash value generated by the hash-value generating unit 190.

As described above, the first-memory control unit 140 determines one of the unexpected receive-buffer first parts 161 to 164 as an area for temporarily storing the received message. Furthermore, the second-memory control unit 150 determines one of the unexpected receive-buffer second parts 201 to 204 corresponding to the input hash value as an area for temporarily storing the received message.

When the unexpected receive-buffer first parts 161 to 164 and the unexpected receive-buffer second parts 201 to 204 are formed on the first memory 160 and the second memory 200, respectively, as the areas for temporarily storing the received message, the hash-value generating unit 190 outputs, as the hash value, substantially 2-bit data for specifying one of the unexpected receive-buffer first parts 161 to 164 and one of the unexpected receive-buffer second parts 201 to 204.

Although the number of the unexpected receive buffers is set to four in the first embodiment, it is not limited to four. In terms of performance, it is preferable that the number of the unexpected receive buffers is larger within an allowable range of a memory capacity allocated to the first memory 160 or a storage capacity of the first-memory control unit 140 in which buffer control information such as the pointer can be stored, so as to increase the probability that the reduced number of reading operation is performed on the unexpected receive buffers to retrieve a message having a matching key.

In the MPI, messages sent from the same source are required to reach the destination in an order of transmission. Therefore, it is preferable that each of the unexpected receive buffers is controlled to operate as the FIFO buffer. If the envelopes of the messages received via the internal network 4 contain the same "source" (source rank) and the same "comm" (communicator), the same hash value is output for the messages based on the hash function, so that the messages are stored in the same unexpected receive buffer. Therefore, when the reading operation starts from message at the head of the unexpected receive buffer that is controlled to operate as the FIFO buffer, the earliest-sent message can be read earlier among messages having a matching key and stored in the unexpected receive-buffer first parts 161 to 164. Therefore, in the MPI, it is preferable to input the "source" and the "comm" to the hash-value generating unit 190. However, because an application often uses only one type of the "comm", it is preferable to input the "source" to the hash-value generating unit 190 for practical purposes.

As shown in FIG. 2, the prefetch buffer 180 acquires the second-part message from the second memory 200 via the second-memory control unit 150, and stores therein the acquired second-part message. Furthermore, the prefetch buffer 180 sends the second-part message to the host interface unit 170. The second-part message sent to the host interface unit 170 is deleted from the prefetch buffer 180.

In response to a transmission request from the host unit 20 by which the receive function is called, the host interface unit 170 sends to the host unit 20 the first-part message that is stored in the first memory 160 and corresponds to the receive function. Thus, the host interface unit 170 functions as a message output unit and an output unit. The host unit 20 searches a storage area (corresponding to the subsequent pointer) of the second-part message corresponding to the first-part message corresponding to the receive key of the receive function. Then, the host unit 20 accesses the received message (second-part message) stored in the second memory 200 or the prefetch buffer 180 corresponding to that storage area (i.e., the subsequent pointer) via the host interface unit 170.

On the other hand, because a computer program (for example, a system of the MPI) executed by the CPU 51 shares the hash function used by the hash-value generating unit 190, the host unit 20 can execute the hash function by an input of the receive key that is specified as the argument upon calling the receive function (for example, MPI_Irecv( )), so that the host unit 20 can obtain the hash value. With the above configuration, the host unit 20 can determine which one of the unexpected receive-buffer first parts 161 to 164 stores the message to be received by the receive function.

When a communication library is implemented based on a message passing model for two-sided communication such as the MPI, there is a problem that the messages do not always reach a receive node in an order the receiver desires.

Figure 5:
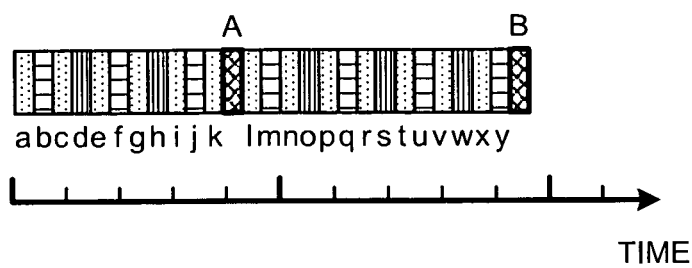
FIG. 5 is a schematic diagram for explaining a retrieval time of a message according to a conventional technology.

In the conventional technology as described above, the host unit 20 repeats reading of an envelope from the first memory 160 and comparing of receive keys until the receive keys match, so that a message having a matching receive key can be retrieved from the unexpected receive buffer. However, for example, in the FT and the IS of the NAS Parallel Benchmarks (NPB), because a large number of messages close to the number of nodes remain in the unexpected receive buffer, a longer time is required for the retrieval, resulting in an increase in a communication latency. Hence, when the FT and the IS of the NPB is executed in a parallel system including a large number of nodes, a desired message B is buried in a large number of messages that has been received at earlier times than the message B as shown in FIG. 5, and the message B must be retrieved from the large number of messages. In this case, the time required for retrieving the desired message B is a sum of time required for transferring the envelopes and for comparing the keys of "all" the messages received earlier. In an example shown in FIG. 5, the messages are received in the order of a, b, . . . , k, A, l, m, . . . , y, B. Assume that the host unit 20 executes a receive function for receiving the message B in the example of FIG. 5. If a conventional technique is employed, a processing system of the MPI searches the messages B starting from the head of 28 messages that have been received at earlier times than the message B based on the envelopes of the 28 messages, to extract the message B from the receive buffer.

On the other hand, in the first embodiment, the envelopes are selectively stored based on the hash value in the unexpected receive-buffer first parts 161 to 164 that can be accessed by the host unit 20 with a low latency, and the envelopes are maintained in the unexpected receive-buffer first parts 161 to 164 in the FIFO order.

The host unit 20 reads, via the host interface unit 170 and the first-memory control unit 140, an envelope from the head of the unexpected receive-buffer first parts 161 to 164 and repeats reading of the envelope and comparing of receive keys until the receive key matches the receive key specified by the receive function.

Figure 6:
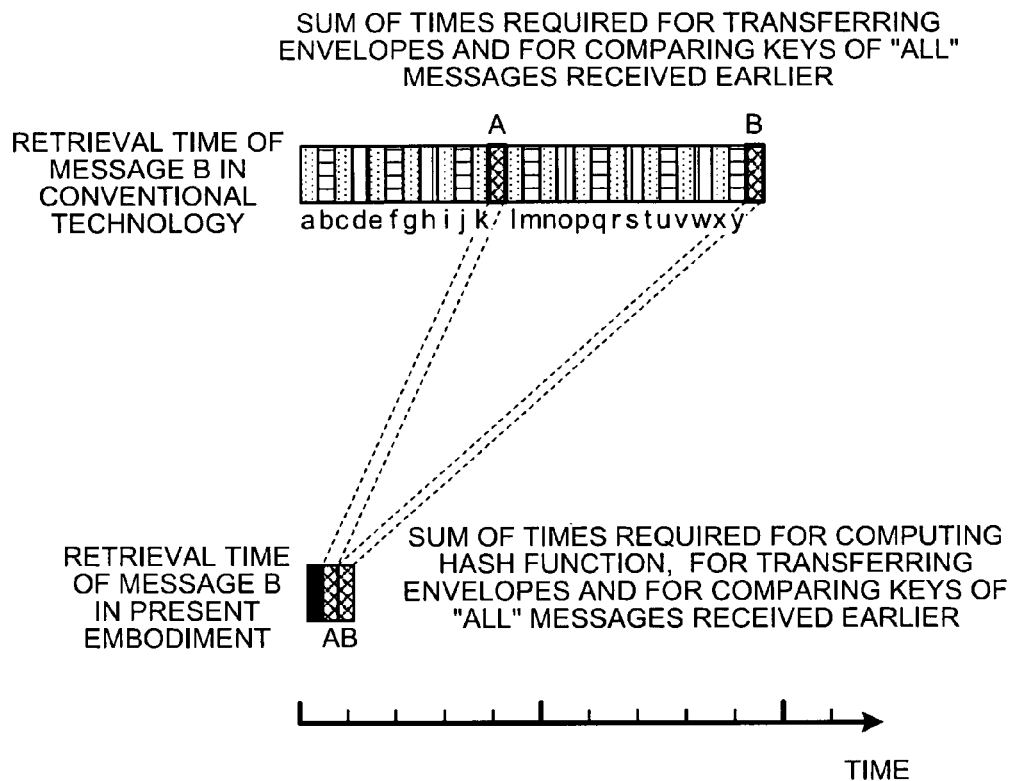
FIG. 6 is a schematic diagram for explaining the retrieval time of a message according to the first embodiment.

FIG. 6 is a schematic diagram for explaining the time required for retrieving the message B according to the first embodiment. In an example of FIG. 6, the receive keys in the envelopes of the message B and a message A that has been received earlier than the message B correspond to the same hash value. Therefore, the time required for retrieving the message B for reception is a sum of a computation time of the hash value, a time required for reading the envelope of the message A stored in one of the unexpected receive-buffer first parts 161 to 164 corresponding to the computed hash value, comparing the receive keys, and detecting mismatch of the receive keys, and a time required for reading the envelope of the message B stored in the one of the unexpected receive-buffer first parts 161 to 164 corresponding to the computed hash value, comparing the receive keys, and detecting match of the receive keys. More specifically, because all of the other messages have different hash values from that of the message A and the message B, the other messages are stored in different unexpected receive buffers from that in which the message A and the message B are stored. Therefore, the first embodiment can eliminate the time required for processing the messages other than the messages A and B in the conventional technique at the time of reception of message B, thereby speeding up the message retrieval. For example, assume that the received messages arrive in the order of a, b, . . . , k, A, l, m, . . . , y, B, and both the message A and the message B correspond to a hash value 3. In this case, the messages A and B are stored in the same unexpected receive-buffer first part 163 in this order. Therefore, the host unit 20 can extract the envelope of the message B simply by computing the hash function to obtain the hash value 3, and acquiring the envelopes of the message A and the message B from the unexpected receive-buffer first part 163 corresponding to the hash value 3. Thus, it is possible to reduce the latency in retrieving the message B by the host unit 20.

FIG. 7 is a flowchart of a message receiving operation performed by the communication control device 100. When the network control unit 110 receives a message via the internal network 4 (Yes at Step S101), the division control unit 120 divides the received message into a first-part message and a second-part message (Step S102). The division control unit 120 sends the first-part message (or the small-size received message) to the first-memory control unit 140 (Step S103), and sends the second-part message to the second-memory control unit 150 (Step S104).

The hash-value generating unit 190 generates a hash value of the first-part message (or the small-size received message), and sends the generated hash value to the first-memory control unit 140 (Step S105). The hash-value generating unit 190 generates a hash value of the second-part message, and sends the generated hash value to the second-memory control unit 150 (Step S106).

Then, the first-memory control unit 140 selectively stores the first-part message (or the small-size received message) in any one of the unexpected receive-buffer first parts 161 to 164 depending on the hash value (Step S107).

The second-memory control unit 150 selectively stores the second-part message in any one of the unexpected receive-buffer second parts 201 to 204 depending on the hash value (Step S108).

Thus, the message receiving operation is completed by the communication control device 100.

An operation for transferring the received message from the communication control device 100 to the host unit 20 is described. FIG. 8 is a block diagram for explaining the functional configuration of the host unit 20. The host unit 20 includes a received-message requesting unit 205, a second-part message requesting unit 206, a cache memory 207, and a control-information managing unit 208 that are realized by the CPU 51 executing a computer program loaded on the HDD 55.

If data corresponding to a predetermined address is not present in the cache memory 207, the received-message requesting unit 205 requests the communication control device 100 to send a received message by specifying the address. The received-message requesting unit 205 then obtains a first-part message or a small-size received message from the communication control device 100, and stores the obtained message in the cache memory 207. The received-message requesting unit 205 obtains the first-part message or the small-size received message depending on a cache line size. The second-part message requesting unit 206 requests the communication control device 100 to send a second-part message, and then obtains the second-part message from the communication control device 100.

The control-information managing unit 208 extracts control information, i.e., the envelope, from the first-part message or the small-size received message obtained by the received-message requesting unit 205. The control-information managing unit 208 then determines whether the receive key contained in the envelope matches the receive key specified by the receive function. Thus, it is determined whether this message is to be received.

If the data obtained by the received-message requesting unit 205 is the first-part message, the control-information managing unit 208 instructs the second-part message requesting unit 206 to request the communication control device 100 to send the second-part message. The control-information managing unit 208 determines whether the obtained data is the first-part message or not by determining whether the data size indicated by the size information stored in the first-part message is larger then the data size of the first-part message.

The second-part message requesting unit 206 requests the communication control device 100 to send the second-part message, and obtains the second-part message from the communication control device 100.

The host unit 20 is a cache-based system. Therefore, the first-part message or the small-size received message stored in the first memory 160 is sent to the host unit 20 in a burst transmission by an access that occurs due to a cache miss hit or a prefetch command in the host unit 20. Thus, it is possible to send the message with a low latency and a high bandwidth.

FIG. 9 is a flowchart of an operation of transferring a received message from the communication control device 100 to the host unit 20. In this operation, the message received by the communication control device 100 via the internal network 4 in the message receiving operation as shown in FIG. 7 is sent to the host unit 20 in response to a request from the host unit 20.

The received-message requesting unit 205 sends a received-message request to the communication control device 100 (Step S200). In the communication control device 100, when the host interface unit 170 receives the received-message request, the first-memory control unit 140 reads data from one of the unexpected receive-buffer first parts 161 to 164 specified by the host unit 20 depending on the hash value (Step S202). Specifically, the first-memory control unit 140 reads the small-size received message or the first-part message. Then, the host interface unit 170 sends the read data to the host unit 20 (Step S204).

At this time, for example, a flag indicating that the second-part message as well as the first-part message is present is stored in the entry, and it is determined whether the second-part message is present depending on presence or absence of the flag.

If the second-part message is present (Yes at Step S210), the second-memory control unit 150 reads the second-part message that is indicated by the subsequent pointer from the second memory 200 (Step S212). Then, the second-memory control unit 150 stores the read second-part message in the prefetch buffer 180 (Step S214).

In the host unit 20, the received-message requesting unit 205 acquires the first-part message or the small-size received message, and stores data of the acquired message in the cache memory 207. At this time, the control-information managing unit 208 extracts an envelope from the data. Then, it is determined whether a receive key contained in the envelope matches the receive key specified by the receive function. Then, it is determined whether the data having the matching receive key is the first-part message, i.e., whether the second-part message is present.

If it is determined that the second-part message is present based on the subsequent pointer stored with the first-part message (Yes at Step S220), the second-part message requesting unit 206 sends a second-part message request to the communication control device 100 (Step S222).

If the requested second-part message is present in the prefetch buffer 180 (Yes at Step S230), the host interface unit 170 of the communication control device 100 reads the second-part message from the prefetch buffer 180 (Step S232). On the other hand, if the requested second-part message is not present in the prefetch buffer 180 (No at Step S230), the host interface unit 170 reads the second-part message from the second memory 200 via the second-memory control unit 150 (Step S234).

The case where the requested second-part message is not present in the prefetch buffer 180 can be considered that, for example, because the host unit 20 is operated at a high speed, the prefetch buffer 180 cannot catch up with the host unit 20, or that, although the second-part message is once stored in the prefetch buffer 180, the second-part message is already deleted from the prefetch buffer 180 when the second-part message request is received because there is not enough free space. Moreover, it can be considered that the second-part message is not written in the prefetch buffer 180, because it is configured such that the second-part message is not written in the prefetch buffer 180 when the prefetch buffer 180 does not have free space in which new data can be written.

The host interface unit 170 sends the second-part message to the host unit 20 (Step S236). Thus, the operation of transferring the received message from the communication control device 100 to the host unit 20 is completed.

As described above, if the second-part message corresponding to data requested by the host unit 20 is stored in the second memory 200, the second-part message is read out from the second memory 200 and stored in the prefetch buffer 180 before the host unit 20 sends a request for the second-part message, because the prefetch buffer 180 can transfer data to the host unit 20 with relatively low latency. In this manner, it is possible to increase the possibility that the second-part message is present in the prefetch buffer 180 when the second-part message is requested by the host unit 20. Therefore, the second-part message can be sent to the host unit 20 with a low latency.

Thus, it is possible to reduce the latency in receiving the received message including the second-part message by the host unit 20. Furthermore, although the whole message cannot be stored in the first memory 160 having the small capacity, it is possible to improve the bandwidth for the received message having a medium data size in which the latency can largely affect the bandwidth.

As described above, in the first embodiment, received message is stored in one of the receive buffers which is selected based on the hash value generated from the receive key contained in the received message. In response to a transmission request sent from the receiving unit which performs receiving operation by determining whether the receive key in the message matches with the receive key specified by the receive function, the received message is output from the receive buffer corresponding to the hash value. Because it is highly likely that received message having the receive key that does not match the receive key specified by the receive function is stored in a different receive buffer, it is possible to largely reduce the time required for retrieving the received message having the receive key matching the receive key specified by the receive function, compared with the conventional technology.

More specifically, one of the receive buffers is selected based on the hash value generated from the receive key contained in the received message, and a received message is stored in the selected receive buffer. Further, at least one received message is output as a candidate for the received message corresponding to the receive function from the receive buffer corresponding to the hash value in response to a transmission request from the receiving unit that performs a receiving operation by determining whether the receive key matches the receive key specified by the receive function. Thus, even when a large number of messages each having the receive key that does not match the receive key specified by the receive function are received before a message having the matching receive key is received, because it is highly likely that the received message having the receive key that does not match the receive key specified by the receive function is stored in a different receive buffer, it is possible to largely reduce the time required for retrieving the received message having the receive key matching the receive key specified by the receive function, compared with the conventional technology.

To achieve the above effect, it is not necessary to use a content addressable memory (CAM) that is likely to have a large amount of hardware, or random logics that are arranged corresponding to a potential number of remaining messages like the ALPU. Therefore, it is possible to support a large potential number of remaining messages with a small amount of hardware.

Although, in the first embodiment, the 32-byte data including the envelope is stored as the first-part message in the first memory 160, the present invention is not limited to that configuration, and the envelope alone can be stored in the first memory 160. Specifically, the envelope and a pointer indicating an address of the second memory 200 in which data of the received message other than the envelope is stored may be stored in an entry.

In such a case, if the data size of the received message is larger than the data size for the entry, the division control unit 120 extracts only the envelope from the received message instead of dividing the received message into the first-part message and the second-part message. Then, the division control unit 120 sends the envelope to the first-memory control unit 140 and sends the rest of the data to the second-memory control unit 150.

Alternatively, the hash-value generating unit 190 may be configured to change the hash-value generation rule. As the simplest example of the hash-value generation rule, when the number of used buffers is n-th power of 2 and the buffers are selectively used, the least significant N bits of the "source" contained in the envelope can be the hash value.

However, because in such a rule, it is likely that the hash value is output in a biased manner depending on a connection topology of the parallel system or a communication pattern of an application, the effect achieved by selectively storing the message in one of the buffers can be reduced. To solve such a problem, for example, the hash-value generating unit 190 stores therein a plurality of hash-value generation rules, and selectively uses one of the hash-value generation rules based on an input from the setting unit 130, or changes a parameter, or the like, for generating the hash value, so that an appropriate hash value can be obtained. Thus, the setting unit 130 functions as a changing unit and a rule changing unit.

Moreover, instead of being input from the setting unit 130, data for specifying the hash-value generation rule may be contained in the received message, and the hash-value generation rule may be selected based on the data, so that an appropriate hash value can be obtained for each application.

Although the communication control device 100 is formed by the LSI in the first embodiment, the present invention is not limited to that configuration. The communication control device 100 is not necessarily formed by a hard-wired logic. For example, all or some of functions of the communication control device 100 can be performed by operating the CPU 51 of the host unit 20 by a computer program.

A second embodiment of the present invention is described with reference to FIGS. 10 and 11. In the second embodiment, the same reference numerals are used for the same components as those in the first embodiment, and detailed descriptions of such components are not repeated.

Figure 10:
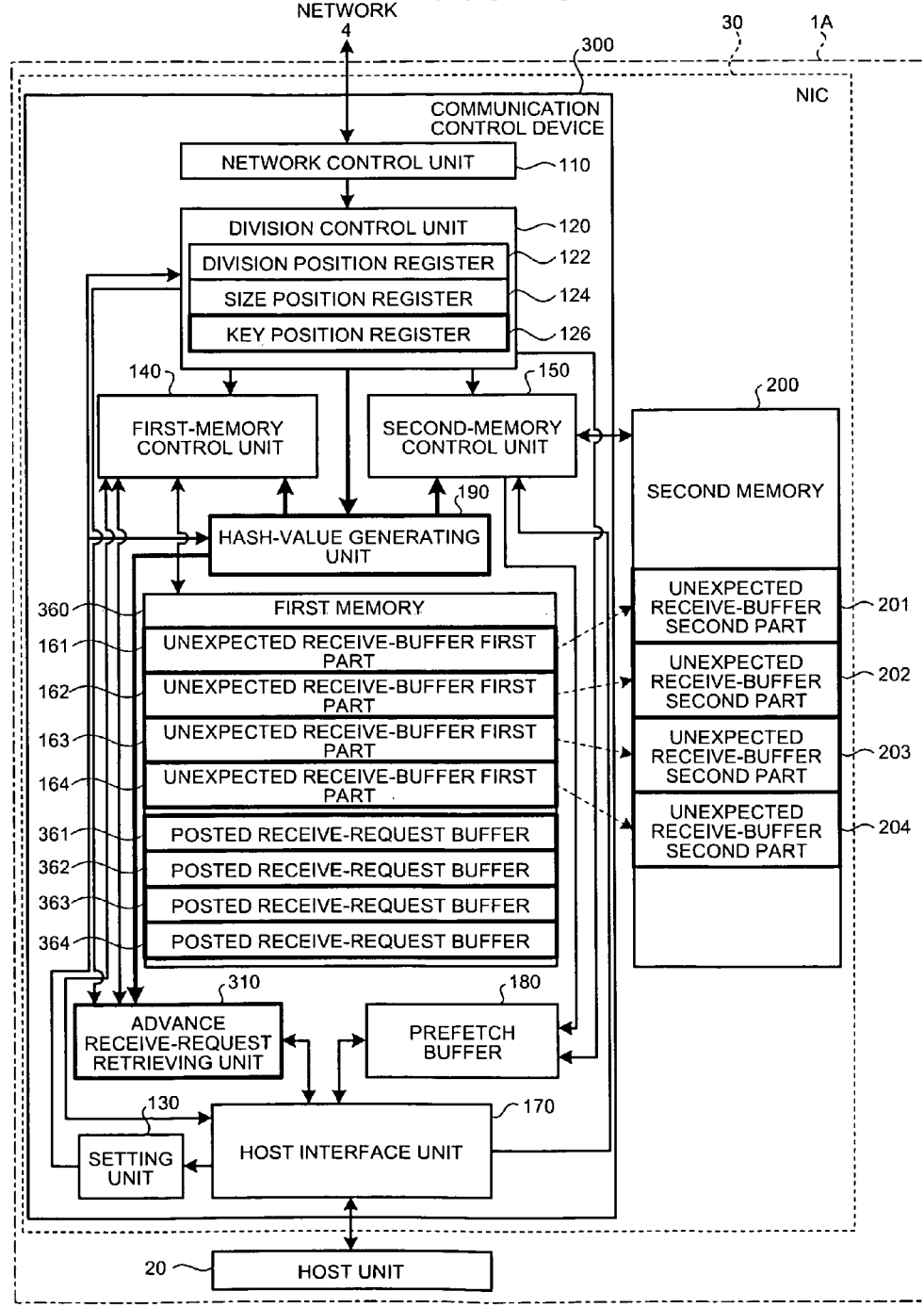
FIG. 10 is a block diagram for explaining the configuration of a PC according to a second embodiment of the present invention.

FIG. 10 is a block diagram for explaining the configuration of a PC 1A according to the second embodiment. The PC 1A includes an NIC 30 which includes a communication control device 300 instead of the NIC 10 of the first embodiment. Further, the communication control device 300 includes a first memory 360 in place of the first memory 160 of the first embodiment. As described above, in the first embodiment, the first-part message or the whole of the small-size received message received from the division control unit 120 is stored in the unexpected receive-buffer first parts 161 to 164 that are formed in the first memory 160 and controlled based on the hash value. However, the buffers controlled based on the hash value are not necessarily the unexpected receive buffer. In the second embodiment, a plurality of posted receive-request buffers 361 to 364 formed in the first memory 360 that is the storage unit is employed as the buffers controlled based on the hash value. It is preferable that each of the posted receive-request buffers is controlled to operate as the FIFO buffer.

Here, the posted receive-request buffer is a buffer in which receive-request information (receive information) is stored. In the MPI, the receive-request information is given as an argument of the receive function, such as a receive key and a destination to store a received message, when the receive function is called before a message having a corresponding receive key is received. The posted receive-request buffer does not need to have a second part for receiving the second-part message because the message is not received yet when the information is stored in the posted receive-request buffer. Thus, functions of a receive-request storing unit and a storing unit can be performed.

An advance receive-request retrieving unit 310 receives the receive key of the received message and the hash value from the division control unit 120 and the hash-value generating unit 190, selects any one of the posted receive-request buffers 361 to 364 corresponding to the hash value, and retrieves an advance receive request containing the corresponding receive key.

Although it is preferable that the advance receive-request retrieving unit 310 is formed by a hard-wired logic in terms of reduction of lowest communication latency, the advance receive-request retrieving unit 310 is not necessarily formed by the hard-wired logic. Furthermore, the advance receive-request retrieving unit 310 is not necessarily arranged on the communication control device 300 in the PC 1A. For example, all or some of functions of the advance receive-request retrieving unit 310 can be performed by operating the CPU 51 of the host unit 20 by a computer program. In the second embodiment, the first-memory control unit 140 is a message output unit that outputs a message to the advance receive-request retrieving unit 310. On the other hand, if the advance receive-request retrieving unit 310 is operated by a computer program on the host unit 20, the host interface unit 170 is the message output unit.

FIG. 11 is a flowchart of a message receiving operation performed by the communication control device 300. When the network control unit 110 receives a message via the internal network 4 (Yes at Step S101), the advance receive-request retrieving unit 310 retrieves receive-request information corresponding to the received message in the posted receive-request buffers 361 to 364 via the first-memory control unit 140 before retrieving the message in the unexpected receive-buffer first parts 161 to 164 (Step S201).

If the advance receive-request retrieving unit 310 determines that an entry containing the corresponding receive key is present in the posted receive-request buffers 361 to 364 (Yes at Step S202), the host interface unit 170 sends a payload portion of the received message that remains in the division control unit 120 to the host unit 20 via the prefetch buffer 180 (Step S203). Thus, functions of the message output unit and the output unit are performed. If the host interface unit 170 has a function of performing the DMA transmission to the main memory of the host unit 20, the payload portion can be sent by the DMA transmission using an address in which the payload portion is to be written and a data size of the payload portion stored in the advance receive-request retrieving unit 310. If the host interface unit 170 does not have the function of performing the DMA transmission, it can be configured such that a reception of a message is notified of the host unit 20 by performing an interrupt to the host unit 20 or changing a status flag that can be read from the host unit 20, and the payload portion is copied to the main memory of the host unit 20 by a computer program loaded on the host unit 20.

If the advance receive-request retrieving unit 310 determines that an entry containing the corresponding receive key is not present in the posted receive-request buffers 361 to 364 (No at Step S202), the received message is stored in any one of the unexpected receive-buffer first parts 161 to 164. Specifically, the division control unit 120 divides the received message into a first-part message and a second-part message (Step S102). The division control unit 120 sends the first-part message (or the small-size received message) to the first-memory control unit 140 (Step S103), and sends the second-part message to the second-memory control unit 150 (Step S104).

The hash-value generating unit 190 generates a hash value of the first-part message (or the small-size received message), and sends the generated hash value to the first-memory control unit 140 (Step S105). The hash-value generating unit 190 generates a hash value of the second-part message, and sends the generated hash value to the second-memory control unit 150 (Step S106).

Then, the first-memory control unit 140 selectively stores the first-part message (or the small-size received message) in any one of the unexpected receive-buffer first parts 161 to 164 of the first memory 360 depending on the hash value (Step S107).

The second-memory control unit 150 selectively stores the second-part message in any one of the unexpected receive-buffer second parts 201 to 204 of the second memory 200 depending on the hash value (Step S108).

Thus, the message receiving operation is completed by the communication control device 300.

As described above, in the second embodiment, the receive-request information corresponding to the receive function called by the receiving unit is stored in the selected one of the receive buffers depending on the hash value generated from the receive key of the receive function until the message corresponding to the receive function is received. Thus, the receive-request information is stored in a selected one of the receive buffers, and pieces of the receive-request information are maintained in the receive buffer in an order in which receive functions corresponding to the pieces of the receive-request information are activated, so that the advance receive-request retrieving unit 310 can easily access the receive-request information. If, upon reception of the message, the receive-request information is stored in the receive buffer corresponding to the hash value generated from the receive key contained in the received message, it is possible to reduce the time required for the advance receive-request retrieving unit 310 to retrieve the receive-request information (in which a final storage area is written) having the matching receive key. Thus, it is possible to output the received message to the final storage area in a short time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication control device controlling communication between a network and a host unit, comprising:

a first memory that includes a plurality of receive buffers each storing therein received information that corresponds to all or a part of a received message or an argument of a receive function, each receive buffer being a buffer that functions as a FIFO buffer, the first memory having a smaller capacity and a lower latency from an issue of a request to a reception of a response to the request compared to a second memory that is connected to the communication control device;

a hash-value generating unit that generates a hash value from a receive key contained in the received message in accordance with a hash-value generation rule, the hash value being used as a pointer that specifies one of the receive buffers and that is controlled by hardware;

a dividing unit that divides the received message into a first-part message and a second-part message, the first-part message being a portion of the received message located before a predetermined position and including the receive key;

a first-memory control unit that controls the first memory such that the first-part message is stored in a selected one of the receive buffers that corresponds to the hash value;

a second-memory control unit that controls the second memory such that the second-part message is stored in the second memory; and an output unit that sends the received information in a burst transmission from one of the receive buffers corresponding to the hash value in response to a transmission request from the host unit that performs a receiving operation by determining a matching based on a receive key specified by the receive function, the host unit including a central processing unit and a memory.

2. A communication control device controlling communication between a network and a host unit, comprising:
- a first memory that includes a plurality of receive buffers each storing therein all or a part of a received message to be processed by a library for message passing in a distributed-memory parallel processing, each receive buffer being a buffer that functions as a FIFO buffer, the first memory having a smaller capacity and a lower latency from an issue of a request to a reception of a response to the request, compared to a second memory that is connected to the communication control device;
- a hash-value generating unit that generates a hash value from a receive key contained in the received message in accordance with a hash-value generation rule, the hash value being used as a pointer that specifies one of the receive buffers and that is controlled by hardware;
- a dividing unit that divides the received message into a first-part message and a second-part message, the first-part message being a portion of the received message located before a predetermined position and including the receive key;
- a first-memory control unit that controls the first memory such that the first-part message is stored in a selected one of the receive buffers that corresponds to the hash value;
- a second-memory control unit that controls the second memory such that the second-part message is stored in the second memory; and
- a message output unit that sends at least one candidate in a burst transmission for the received message corresponding to a receive function from one of the receive buffers corresponding to a hash value generated from a receive key specified by the receive function in response to a transmission request from the host unit that performs a receiving operation by determining a matching based on the receive key specified by the receive function, the host unit including a central processing unit and a memory.

3. The communication control device according to claim 2, further comprising a changing unit configured to change the hash-value generation rule of the hash-value generating unit.

4. The communication control device according to claim 3, wherein the changing unit is configured to change the hash-value generation rule to be used depending on information contained in the received message.

5. An information processing device comprising:
- a host unit comprising a central processing unit and a memory,
- a communication control device that controls communication between a network and the host unit, and
- a second memory that is connected to the communication control device, the communication control device including:
- a first memory that includes a plurality of receive buffers each storing therein received information that corresponds to all or a part of a received message or an argument of a receive function, each receive buffer being a buffer that functions as a FIFO buffer, the first memory having a smaller capacity and a lower latency from an issue of a request to a reception of a response to the request, compared to the second memory,
- a hash-value generating unit that generates a hash value from a receive key contained in the received message in accordance with a hash-value generation rule, the hash value being used as a pointer that specifies one of the receive buffers and that is controlled by hardware,
- a dividing unit that divides the received message into a first-part message and a second-part message, the first-part message being a portion of the received message located before a predetermined position and including the receive key;
- a first-memory control unit that controls the first memory such that the first-part message is stored in a selected one of the receive buffers that corresponds to the hash value;
- a second-memory control unit that controls the second memory such that the second-part message is stored in the second memory; and
- an output unit that sends the received information in a burst transmission from one of the receive buffers corresponding to the hash value in response to a transmission request from a receiving unit that performs a receiving operation by determining a matching based on a receive key specified by the receive function; and the host unit containing the hash-value generation rule to be used by the hash-value generating unit included in the communication control device, and acquiring, from the communication control device, received information stored in a desired one of receive buffers included in the communication control device based on a hash value obtained by an input of a receive key specified by a receive function.

6. A non-transitory computer readable medium including programmed instructions for communication control, wherein the instructions, when executed by a computer, cause the computer to perform operations comprising:
- generating a hash value from a receive key contained in a received message in accordance with a hash-value generation rule, the hash value being used as a pointer that specifies one of a plurality of receive buffers and that is controlled by hardware, the receive buffers each configured to store received information that corresponds to all or a part of a received message or an argument of a received function, each receive buffer being a buffer that functions as a FIFO buffer and that is included in a first memory, the first memory having a smaller capacity and a lower latency from an issue of a request to a reception of a response to the request, compared to a second memory that is connected to the communication control device;
- dividing the received message into a first-part message and a second-part message, the first-part message being a portion of the received message located before a predetermined position and including the receive key;
- controlling the first memory such that the first-part message is stored in a selected one of the receive buffers that corresponds to the hash value;
- controlling the second memory such that the second-part message is stored in the second memory; and
- sending the received information in a burst communication from one of the receive buffers corresponding to the hash value in response to a transmission request from the host unit that performs a receiving operation by determining a matching based on a receive key specified by the receive function, the host unit including a central processing unit and a memory.

* * * * *